Feb. 7, 1967  D. G. THOMAS  3,302,701
TURBULENCE PROMOTER FOR INCREASED HEAT AND MASS TRANSFER
Filed Oct. 19, 1965  3 Sheets-Sheet 1
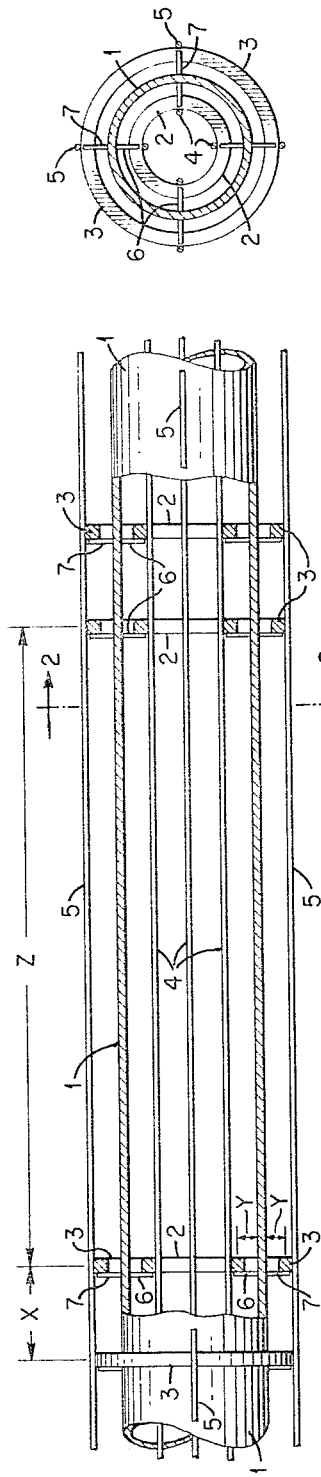
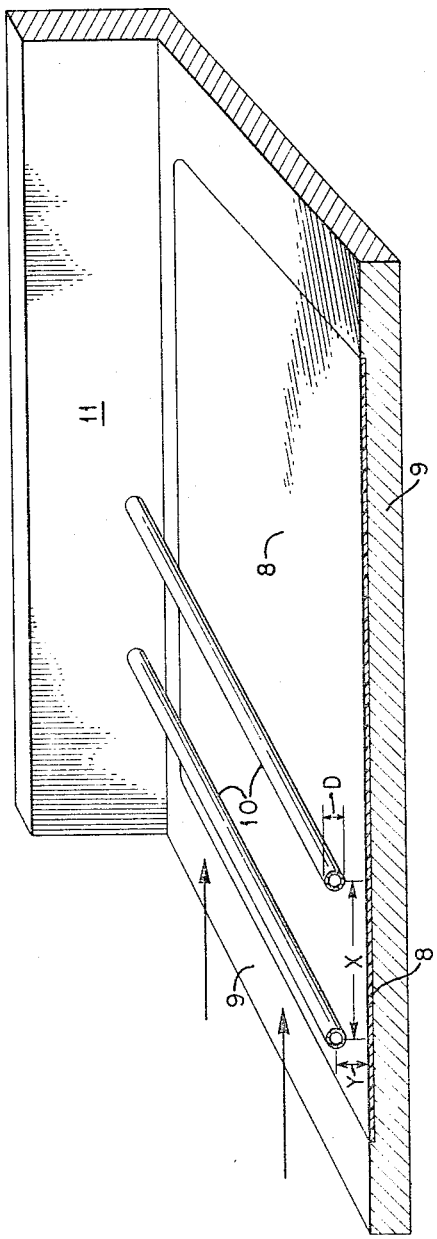
INVENTOR.
David G. Thomas
BY
ATTORNEY.

Feb. 7, 1967   D. G. THOMAS   3,302,701
TURBULENCE PROMOTER FOR INCREASED HEAT AND MASS TRANSFER
Filed Oct. 19, 1965   3 Sheets-Sheet 2

INVENTOR.
David G. Thomas
BY
ATTORNEY.

United States Patent Office 3,302,701
Patented Feb. 7, 1967

3,302,701
TURBULENCE PROMOTER FOR INCREASED
HEAT AND MASS TRANSFER
David G. Thomas, Oak Ridge, Tenn., assignor to the
United States of America as represented by the United
States Atomic Energy Commission
Filed Oct. 19, 1965, Ser. No. 498,169
8 Claims. (Cl. 165—109)

The invention described herein was made in the course of, or under, a contract with the U.S. Atomic Energy Commission. It relates to heat and mass exchangers in general, and more particularly to improved turbulent flow inducing means for increasing the convective heat or mass transfer between an exchange surface and fluid flowing in contact therewith.

Hydrodynamic and thermal boundary layers occur in most flowing fluids where they contact stationary surfaces due to their viscous flow properties. A very thin layer of the fluid immediately adjacent the stationary surface adheres to and is substantially stationary with respect to the surface. Successively adjacent layers of fluid move with increasing velocity with respect to the stationary wall until the free stream velocity is substantially reached and the boundary layer ends. Such boundary layers greatly hamper heat and mass transfer through exchange surfaces.

The efficiency of heat transfer across a heat exchange surface is reduced by a boundary layer which creates adverse temperature gradients and reduces convective fluid mixing. The maintenance of convective fluid mixing is very important in heat transfer systems inasmuch as it is the primary mechanism through which energy is transferred from a heated surface to a fluid stream. Convection is equally important for the same reasons where the energy flow is in the other direction; from a heated fluid to a cooler heat exchange surface. Mass transfer is decreased due to the concentration of transfer material in the boundary layer which decreases the concentration differential across the exchange surface. This decrease in mass transfer results from a decrease in the driving force for the mass exchange mechanism which is generally proportional to the concentration differential.

It is, accordingly, a general object of the invention to provide improved means for mitigating the adverse effects of boundary layers on heat and mass transfer.

Another object of the invention is to provide improved means for achieving increased mixing of a working fluid with a minimum increase in pressure drop.

Other objects of the invention will become apparent from an examination of the following description of the invention and the appended drawings, wherein:

FIG. 1 is a longitudinal sectional view of a tubular heat exchange member utilizing turbulence promoters in accordance with the invention;

FIG. 2 is a transverse sectional view of the heat exchange member of FIG. 1;

FIG. 3 is a perspective view of experimental apparatus used for measuring the "tuning" effect of paired, detached, turbulence promotors;

Figure 4:
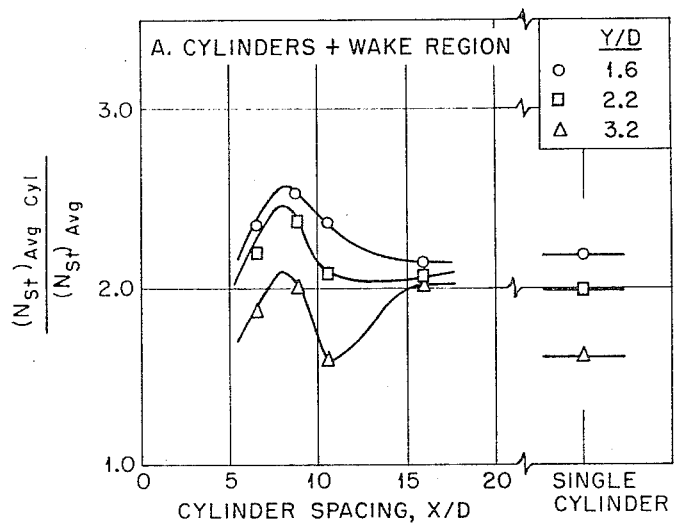
FIG. 4 is a graph illustrating the effects of various spacings between pairs of turbulence promoters on the Average Stanton Number in the area encompassing the turbulence promoters and the wake region downstream therefrom.

In accordance with the present invention, improved turbulent flow inducing means are provided for increasing the convective heat or mass transfer between an exchange surface and fluid flowing in contact therewith. A multiplicity of bar-like turbulence promoters are disposed along the heat or mass exchange surface normal to the direction of fluid flow. The turbulence promoters are uniformly spaced apart from the exchange surface and are spaced from each other by alternative first and second spacings of lesser and greater magnitude respectively.

In order to facilitate an understanding of the invention, reference is made to FIGS. 1 and 2 of the drawings wherein a tubular heat exchange member 1 utilizing the invention is illustrated. Ring shaped turbulence promoters 2 and 3 having a square or rectangular cross section are mounted normal to the fluid flows passing through and also external to tubular heat exchange member 1. Turbulence promoters 2 and 3 are designed to have a projected area in the direction of flow of from 15 to 35 percent (preferably about 25 percent) of the total flow area in the plane of the turbulence promoter. This percentage has been found to provide sufficient turbulence without causing an excessive pressure drop in the working fluid. The projected areas of the turbulence promoters in the direction of flow are equal to their side surface areas as shown in FIG. 2.

The radial distance from the surface of heat exchange member 1 to the center of the transverse cross section of each turbulence promoter determines the degree which the turbulence promoters are "detached" from the surface of the heat exchange member and will be referred to hereafter as Y. The symbol Y will be expressed in terms of D, the difference between the inner and outer radii of the ring shaped turbulence promoters illustrated in FIGS. 1 and 2. Although the symbol D in this particular embodiment can be readily expressed as the difference between two radii, it is meant to refer generally to the width of the projected area of the turbulence promoter projected in the direction of flow. The width is measured in a direction across the projected area normal to the heat or mass exchange surface. Where the turbulence promoter has a circular cross section, as in FIG. 3, D will be equal to the diameter of the circular cross section. An optimum value for Y of about 1.5 D has been found which leaves a gap of width D between the innermost surface of the turbulence promoter and the surface of the heat exchange member. Knowing the total fluid flow area and diameter of each heat exchange member, the projected area and exact size of each turbulence promoter may be readily calculated. The thickness of the turbulence promoter in the direction of flow is not critical and should simply be kept as small as possible while satisfying structural limitations.

It is noted at this point that the above criteria for selecting a suitable turbulence promoter relates only to annular geometries such as the tubular heat exchanger described in FIGS. 1 and 2. Such a geometry predominates in heat transfer apparatus such as boilers, heat exchangers, and condensers. In selecting turbulence promoters for flat plate geometries such as that illustrated in the experimental apparatus of FIG. 3, however, a different criteria is used. Where a flat plate exchange surface exists, it is first necessary to determine the boundary layer thickness along the plate. Turbulence promoters having a projected area width in the direction of flow about half as large as the boundary layer thickness are then selected. The cross sections of the selected turbulence promoters can be varied from the circular section shown to a square, rectangular, or oval configuration without losing the advantages of the invention. The turbulence promoter in the flat plate geometry is spaced apart from the surface a distance $Y=1.5D$ as in the annular geometry. The symbol Y is used to denote the distance from the centerline of the turbulence promoter to the exchange surface along a line normal to the exchange surface, and the symbol D refers generally to the width of the turbulence promoter projected in the direction of flow. The symbols Y and D are illustrated in FIG. 3 together with the symbol X which will be discussed in a later reference to FIG. 1.

Referring again to FIGS. 1 and 2, longitudinal spacer rods 4 and 5 facilitate mounting and maintaining a proper axial spacing between adjacent turbulence promoters. Spacer rods 4 and 5 are welded to the inside and outside surfaces, respectively, of turbulence promoters 2 and 3. Radial spacer pins 6 and 7 maintain a proper radial spacing between turbulence promoters 2 and 3 and the inside and outside walls, respectively, of heat exchanger member 1. Spacer pins 6 and 7 are welded to the turbulence promoters 2 and 3 but need not be welded to tubular heat exchanger 1 if it is desired to make the turbulence promoters removable from the heat exchange member.

Turbulence promoters 2 and 3 are spaced apart axially along heat exchange member 1 by alternative first and second spacings. The first spacing X, which varies from about 7 to 15 D (preferably from 7 to 10 D) is selected to provide a "tuning" effect between the paired turbulence promoters which creates a maximum downstream wake interaction of the vortices created by the turbulence promoters in the moving working fluid. The second spacing Z, which varies from about 50 to 100 D, is determined by the downstream distance through which the vortices shed by the paired turbulence promoters continue to effectively interact.

Although turbulence promoters are shown being used both internally and externally to the tubular heat exchange member in FIGS. 1 and 2, it will be apparent to those skilled in the art that either the internal or external turbulence promoters could be used alone. It is also noted that alternate schemes for mounting and supporting the turbulence promoters may be employed without straying from the scope of the invention which relates to the use of tuned pairs of detached turbulence promoters rather than to an exact scheme for mounting them. The cross section of the annular rings may also be varied from the square configuration shown to a rectangular, circular, or oval configuration without losing the advantages of the invention. Practical fabrication considerations, which vary with the type of exchange surface and working fluid being used, may be considered in selecting the most suitable cross section.

Figure 5:
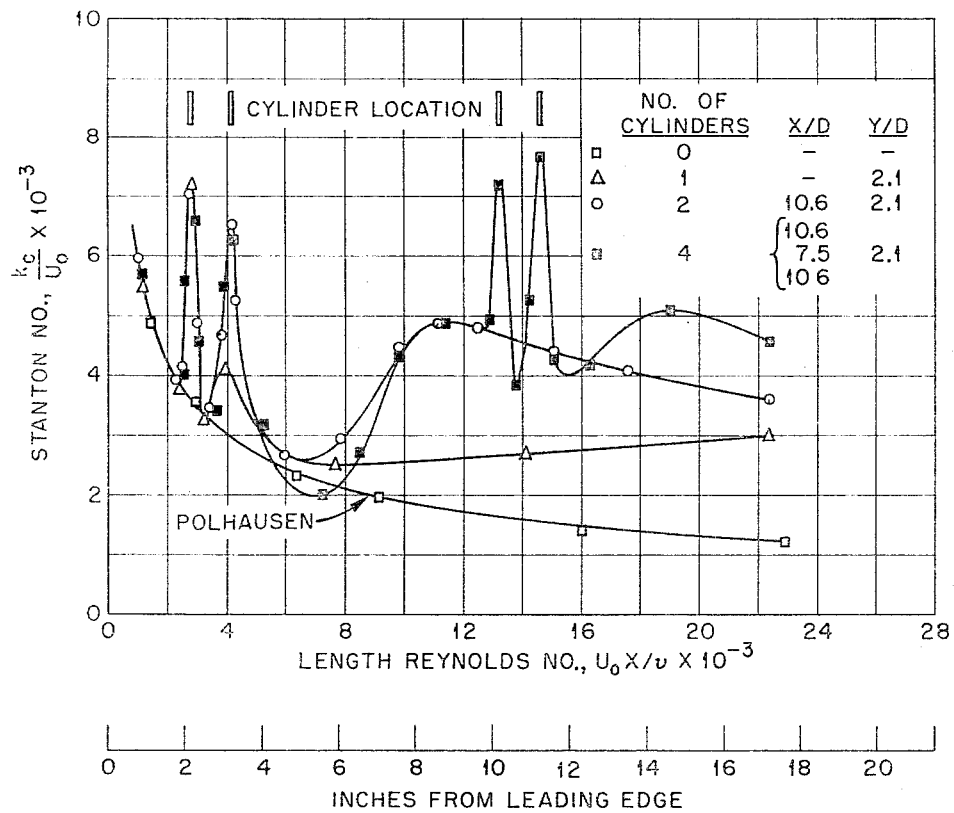
FIG. 5 is a graph comparing the Local Mass Transfer Stanton Number for fluid flow over a flat plate with no turbulence promoters, with a single detached turbulence promoter, and with one and two pairs of tuned detached turbulence promoters.

Experimental apparatus as illustrated in FIG. 3 was used to evaluate the effects of paired detached turbulence promoters on mass transfer as indicated in FIGS. 4 and 5. A layer of naphthalene 8 was provided in a recess in a flat steel plate 9 serving as one wall of a wind tunnel. The naphthalene surface was measured before and after a test run and the amount of naphthalene which had sublimed therefrom used as an indication of mass transfer. Hollow wires 10 having a 0.093 inch outside diameter were used as turbulence promoters although solid wires having the same diameter would have provided the same results. The wires rested in holders in a side plate 11 disposed along the side edges of the naphthalene bearing plate. The centerlines of wires 10 were variably spaced from the naphthalene surface and from each other by the distances indicated in FIGS. 4 and 5.

The effect of the spacing X between the paired turbulence promoters on the average mass transfer Stanton Number is shown in the graph of FIG. 4. The maximum value of the average Stanton Number occurs where the cylindrical turbulence promoter centers are spaced apart from 7 to 10 diameters and located with their centers from 1.2 to 1.8 (preferably about 1.5) diameters from the surface. The tuning effect is especially apparent when the average Stanton Numbers of the paired turbulence promoters are compared with the average Stanton Numbers with a single turbulence promoter as indicated along the right side of FIG. 4.

The results shown in FIG. 5 demonstrate the tuning effect to be gained by proper placement of turbulence promoters. The rate of mass transfer as indicated by the Stanton Number was measured and plotted in FIG. 5 for a flat plate in the absence of turbulence promoters, with a single detached turbulence promoter, and with one and two pairs of tuned detached cylindrical turbulence promoters. The tuning effect of the paired turbulence promoters is quite apparent both in the immediate vicinity of the promoters and also in their wake region downstream therefrom, where significantly higher values of Stanton Number were achieved with the paired turbulence promoters than with single or no turbulence promoters.

Figure 6:
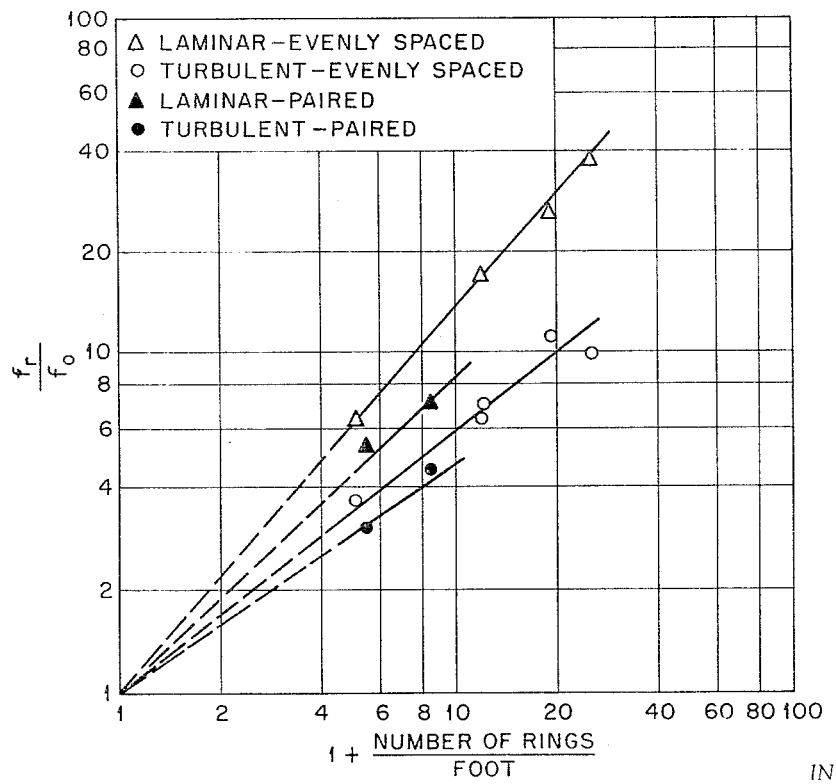
FIG. 6 is a graph comparing the effects of paired and evenly spaced detached turbulence promoters on the friction factor.

Ratios of friction factors with detached turbulence promoters to smooth tube friction factors $(f_r/f_o)$ at a Reynolds number of $10^4$ are shown in FIG. 6 as a function of the number of rings per foot. The effect of using paired rings was to lower the friction factor in both the laminar and turbulent flow regions with the greater effect being felt with laminar flow.

Direct practical applications of turbulence promoters to increase mass transfer rates exist in the fields of electrodialysis and osmosis where mass transfer occurs between solutions which are passed along a membrane. Turbulence promoters increase the mass transfer in these processes by reducing the boundary layers which tend to develop in the flowing solution immediately adjacent the membrane wall. The boundary layers in such cases comprise a layer of solution containing a concentration of solute which differs from that in the main stream of solution and more nearly resembles the solution on the other side of the membrane. For example, in an osmosis process where a dilute solution or solvent is passing through a membrane to a flowing concentrated solution on the other side of the membrane, a boundary layer of less concentrated solution forms on the side of the membrane containing the concentrated solution. Since the driving force in the osmosis process is dependent upon the difference in the solution concentrations across the membrane, a boundary layer of less concentrated material on the concentrated solution side of the membrane will cause a slowing down of the osmosis process.

The above description of the invention was offered for illustrative purposes only, and should not be interpreted in a limiting sense. For example, the means illustrated for securing the turbulence promoters and the turbulence promoter cross sections may be varied without straying from the scope of the invention. It is intended rather that the invention be limited only by the claims appended hereto.

What is claimed is:

1. Means for increasing the convective heat or mass transfer between an exchange surface and a fluid flowing in contact with said surface, comprising: a multiplicity of turbulence promoters disposed normal to the direction of fluid flow, the projected areas in the direction of flow of said turbulence promoters having a width D, said turbulence promoters being spaced apart from said exchange surface a distance substantially equal to said width D, said turbulence promoters being spaced apart from each other by alternative first and second spacing distances, said first spacing distance lying within range from 7 to 15 times said width D, and said second spacing distance lying within the range from 50 to 100 times said width D.

2. Means for increasing the mass transfer rate between a flat mass exchange surface and a fluid flowing in contact with said exchange surface, comprising: a multiplicity of rod-like turbulence promoters having a projected area in the direction of flow of width D, said width D being about one-half the thickness of the laminar boundary layer along said exchange surface in the absence of said turbulence promoters, said turbulence promoters being spaced apart from said flat mass exchange surface by a distance substantially equal to said width D, said turbulence promoters being spaced apart from each other along said heat exchange surface alternatively by first and second spacing distances, said first spacing distance lying within the range from 7 to 15 times said width D, and said second spacing distance lying within a range from 50 to 100 times said width D.

3. The means of claim 1 wherein said turbulence promoters have a circular cross section.

4. Means for increasing the convective heat transfer between a tubular heat exchange member and a fluid flowing axially along the length and in contact with said tubular member, comprising: a multiplicity of annular turbulence promoters disposed concentrically with said tubular heat exchange member and normal to the direction of flow of said fluid, the projected area in the direction of flow of each of said turbulence promoters lying within the range from 15 to 35 percent of the total flow area of the fluid in the plane of the turbulence promoter, said turbulence promoters being spaced apart from the surface of said tubular heat exchange member a distance substantially equal to the width D of said projected area along a line normal to said surface, said turbulence promoters being spaced apart axially from each other by alternative first and second spacing distances, said first spacing distance lying within the range from 7 to 15 times said width D, and said second spacing distance lying within the range from 50 to 100 times said width D.

5. The means of claim 4 wherein said turbulence promoters are disposed outside of said tubular heat exchange member.

6. The means of claim 4 wherein said turbulence promoters are disposed inside of said tubular heat exchange member.

7. The means of claim 4 wherein said turbulence promoters are disposed inside and outside of said tubular heat exchange member.

8. The means of claim 4 wherein said turbulence promoters have a rectangular cross section.

References Cited by the Examiner
UNITED STATES PATENTS

| | | | |
|---|---|---|---|
| 1,243,168 | 10/1917 | Henderson | 138—38 |
| 2,161,887 | 6/1939 | Ramsaur | 165—174 X |
| 2,890,722 | 6/1959 | Loebel et al. | 138—38 |
| 3,071,159 | 1/1963 | Coraggioso | 138—38 |

FOREIGN PATENTS

| | | |
|---|---|---|
| 835,487 | 5/1960 | Great Britain. |
| 929,066 | 6/1963 | Great Britain. |

ROBERT A. O'LEARY, *Primary Examiner.*

A. W. DAVIS, *Assistant Examiner.*